Oct. 10, 1950     H. C. ARMSTRONG     2,525,012
ANTIGLARE DEVICE
Filed June 17, 1947
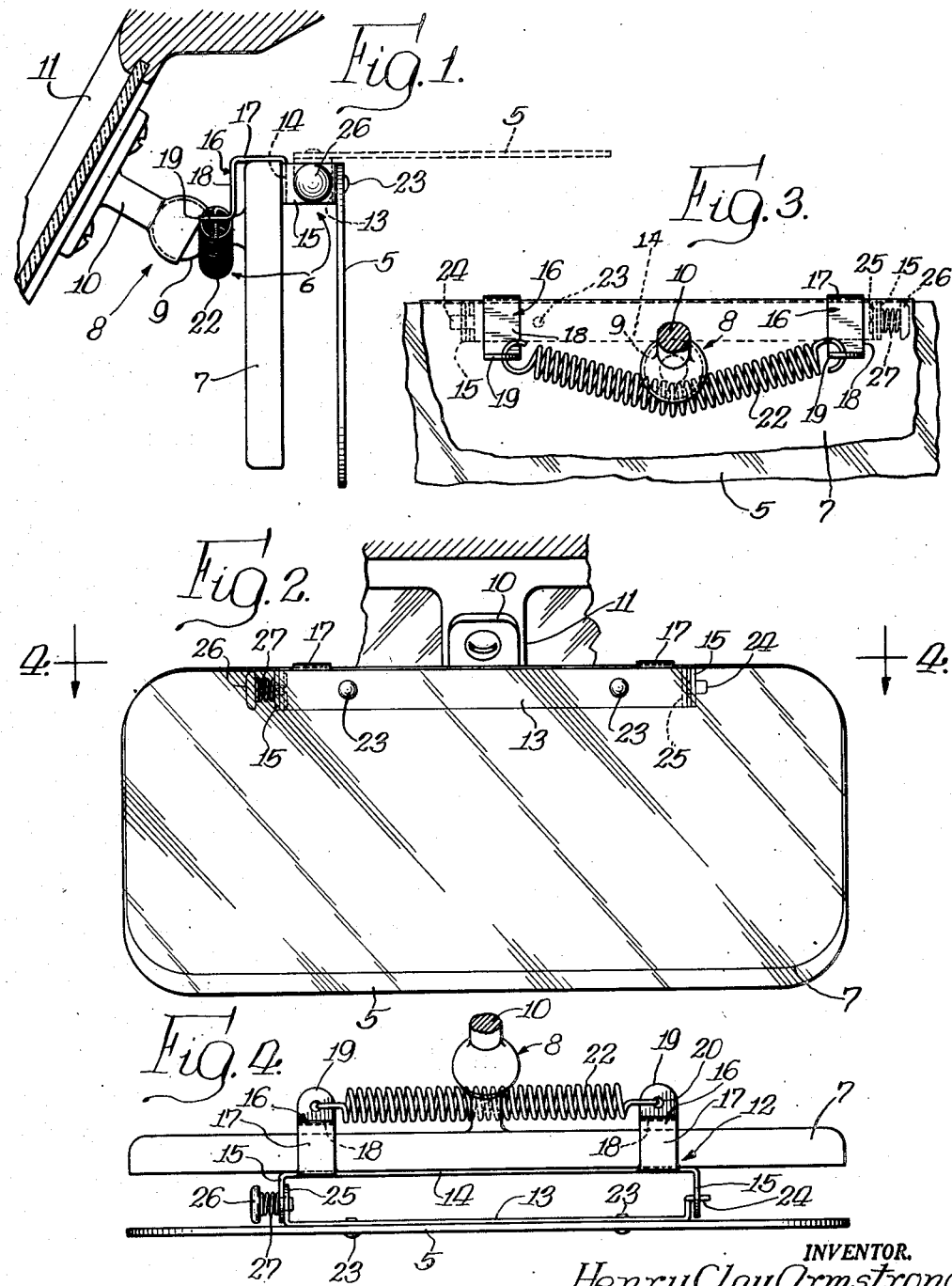
INVENTOR.
Henry Clay Armstrong.

Patented Oct. 10, 1950

2,525,012

UNITED STATES PATENT OFFICE 2,525,012

ANTIGLARE DEVICE

Henry Clay Armstrong, Chicago, Ill.

Application June 17, 1947, Serial No. 755,218

4 Claims. (Cl. 88—77)

The invention relates generally to antiglare devices and more particularly to such a device particularly adaptable for attachment to the rearview mirror of an automobile.

One object of the invention is to provide a new and improved antiglare device for attachment to a rearview mirror that is sturdy, capable of being readily adjusted to one position for night driving and to another position for day driving, and is withall economically and readily manufactured and assembled.

Another object is to provide a new and improved antiglare device for attachment to a rearview mirror that may be attached without tools and in a fraction of a minute by the automobile owner, by filling station attendants, or by the sales person.

Other objects and advantages will become apparent from the following detailed description taken in connection with the accompanying drawing, in which:

Fig. 1 is an end elevational view of a device embodying the features of this invention mounted on the rearview mirror of an automobile. The antiglare shield of the device is shown in solid line outline in operative position, and in broken line outline in inoperative position.

Fig. 2 is a front elevational view of the device of Fig. 1.

Fig. 3 is a fragmentary rear elevational view of the device of Fig. 1.

Fig. 4 is a top plan view of the device of Fig. 1.

While the invention is susceptible of modification, it is shown herein and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

As shown in the drawing for purposes of illustration, the antiglare device comprises a glare shield 5 and means, generally designated 6, for detachably securing the shield in position on a rearview mirror 7 of an automobile. All rearview mirrors are supported for universal adjustment usually by means of a ball and socket joint. As best seen in Fig. 1, most rearview mirrors have a universal support, generally designated 8, with a ball member 9 rigid with and projecting from the rear, that is, nonreflecting, surface or side of the mirror. A socket member 10 receives the ball member 9 frictionally therein and is either secured to the vertical windshield di- viding and bracing strip 11 or is secured to the roof of the automobile at the juncture with the windshield. This mounting of the rearview mirror leaves the upper edge of the mirror free and this fact is herein utilized to make possible a very economically manufactured antiglare device which may be installed in a fraction of a minute and without tools by the automobile owner, a filling station attendant, or a salesman.

As above stated, the antiglare device comprises the shield 5 and mounting means 6. The shield 5 preferably is made of some comparatively stiff material which to a degree diffuses and hence softens light rays. While a variety of materials might be employed and would function satisfactorily, the shield 5 herein is composed of one of the plastics tinted green or brown or black, or some one of the other colors that are light absorptive. The shield 5 is and should be translucent so that when the shield is in operative position over the rearview mirror it will at night permit the reflection of the headlights of a trailing automobile to be observed while at the same time removing the blinding and extremely annoying and irritating glare which is obtained from the rearview mirror in the absence of the glare shield 5. The shield 5 should be of a size to cover the major portion of the rearview mirror and preferably is of a shape conforming to the general shape of the mirror with which it is to be employed; most all such mirrors being generally rectangular.

The attaching means 6, as best seen in Fig. 4, comprises a first element, generally designated 12, adapted for quick and ready attachment or detachment to the rearview mirror 7 and a second element 13 rigidly secured to the shield 5 and pivotally connected with said first element to permit positioning of the shield in either its operative position where it overlies the reflecting face of the mirror, as shown in all of the figures, or in inoperative position swung away from the mirror, as shown in broken line outline in Fig. 1. The first element 12 is in the nature of a channeled member adapted to be received over the top edge of the mirror 7 and having portions projecting downwardly on both sides of the mirror. More particularly, the first element 12 is composed of sheet metal and is formed as an integral unit by means of simple cutting and stamping operations. In the main, the element 12 is composed of a strip 14 constituting that portion of the element which projects downwardly over the front or reflecting face of the rearview mirror. At its ends the strip 14 is bent at right angles to form ears 15. These ears herein are apertured to form bearings, as will hereinafter be made more apparent. Near each end, the strip 14 is formed with a laterally projecting finger 16. Each finger, as clearly seen in Figs. 1 and 4, has a laterally extending portion 17, is then bent at right angles to have a portion 18 parallel to the strip 14, and is then again bent laterally to form an ear 19 preferably formed with an aperture 20. There is thus formed a channel-like construction in which the upper edge of the rearview mirror may be received. The channel portions of the fingers 16 are made wider (see Fig. 1) than the thickness of the heaviest or thickest rearview mirror likely to be found.

Secured to the ears 19 of the fingers 16 with at least one end readily engageable or disengageable with an ear is a coiled tension spring 22. This spring, as best shown in the drawing, is adapted to span, that is, pass around, the member of the support for the mirror which is rigid with and projects from the rear face of the mirror. It will be seen that when the spring is so passed on the side of the supporting member opposite the element 12 the element is drawn securely down onto the upper edge of the mirror and is firmly held against loss.

The second element 13 also is composed of sheet material and is so constructed as also to be formed by simple cutting and shaping operations. The element 13 is rigidly secured to the shield 5 at the upper edge thereof by means of rivets 23. At one end the element 13 is bent laterally, then again bent to extend parallel with the element 13, with that parallel extension reduced in width to form a journal 24 receivable in one of the apertured ears 15 of the first element. The other end of the element 13 is bent laterally to form an ear 25. Like the ears 15, the ear 25 is apertured and passing through the aperture in the ear 25 and through the aperture in the ear 15 adjacent the ear 25 is a rivet, a cotter pin or similar device 26. Herein the part 26 is shown as a split rivet having its tail end divided and bent to extend in opposite radial directions to prevent pulling out of the rivet. Interposed between the head of the rivet 26 and the ear 15 is a compression spring 27. This serves to force the ear 15 and the ear 25 together to provide frictional resistance serving to cause the shield 5 to remain in the position to which it is adjusted.

It is believed apparent from the foregoing that I have perfected an antiglare device which may be very economically manufactured. The material composing the device, with the exception of the springs 22 and 27 and the split rivet 26, all have the simplest possible formation, namely, sheets, and the springs 22 and 27 and the split rivet 26, of course, are manufactured as standard items in large quantities. Formation of the parts involves only simple cutting and shaping operations readily and quickly performed on a die press. Assembly involves merely riveting the element 13 to the shield 5, inserting the trunnion 26 in the aperture in one of the ears 15, and inserting the rivet 26 through the apertures in the ears 15 and 25 and spreading the rivet.

Attachment of the device to the rearview mirror is even more readily accomplished, requires no tools of any nature, and can easily be performed by the most mechanically unskilled person. To attach the device the element 12 is simply placed over the top edge of the rearview mirror. One end of the spring 22 is then hooked into the aperture 20 in one of the ears 19, the spring passed underneath the support for the mirror, and the other end of the spring hooked into the aperture 20 in the remaining one of the ears 19. The device is then firmly attached and the shield 5 may be swung to its operative position, that is, parallel with the mirror for night driving and may be swung to its inoperative position, that is, upwardly, to the broken line outline shown in Fig. 1, for daytime driving. The spring 27 urging the ears 15 and 25 together assures that there will always be a sufficient frictional resistance to swinging of the shield 5 to assure its remaining in either adjusted position.

I claim as my invention:

1. An antiglare device for attachment to the rearview mirror of an automobile comprising a shield of light transfusing material, and means for detachably mounting said shield on a rearview mirror comprising a first integrally-formed element having a channel portion adapted to overlie the upper edge of the mirror, a first set of spaced ears projecting in one lateral direction from the channel portion and apertured to form bearings and a second set of spaced ears projecting in the opposite lateral direction from the opposite side of the channel portion, a second integrally-formed element being in the form of a strip riveted to said shield near one edge thereof and having at one end a laterally offset trunnion receivable in the aperture of one of the apertured ears of said first element and having at the other end a laterally extending and apertured ear, a rivet passing loosely through the aperture in the remaining apertured ear of said first element and the ear of said second element, and a tension spring attached at its ends to the second set of ears of said first element and adapted to pass around the support for the mirror to secure the first element to the mirror.

2. An antiglare device for attachment to the rearview mirror of an automobile comprising a shield of light transfusing material, and means for detachably mounting said shield on a rearview mirror comprising a first integrally-formed element having a channel portion adapted to overlie the upper edge of the mirror, a first set of spaced ears projecting in one lateral direction from the channel portion and apertured to form bearings and a second set of spaced ears projecting in the opposite lateral direction from the opposite side of the channel portion, a second integrally-formed element being in the form of a strip riveted to said shield near one edge thereof and having at one end a lateraly offset trunnion receivable in the aperture of one of the apertured ears of said first element and having at the other end a laterally extending and apertured ear, a rivet passing loosely through the aperture in the remaining apertured ear of said first element and the ear of said second element, a compression spring encircling said rivet and interposed between the head thereof and said ears through which the rivet passes to cause the ears to be urged into frictional engagement with one another, and a tension spring attached at its ends to the second set of ears of said first element and adapted to pass around the support for the mirror to secure the first element to the mirror.

3. An antiglare device for attachment to the rearview mirror of an automobile comprising a shield of light transfusing material and means for detachably mounting said shield on a rearview mirror comprising a first integrally-formed element having a strip-like portion forming one flange of a channel member, each end of the strip-like portion being bent laterally to form spaced ears and each ear being apertured to form a bearing, a pair of fingers extending laterally of the strip-like portion in a direction opposite the ears, thence parallel with the strip-like portion, and thence again laterally, a second integrally-formed element being in the form of a strip riveted to said shield near one edge thereof and having at one end a laterally offset trunnion receivable in the aperture of one of the apertured ears of said first element and having at the other end a laterally extending and apertured ear, a rivet passing loosely through the aperture in the remaining apertured ear of said first element and the ear of said second element, and a tension spring attached at its ends to the laterally projecting tips of said fingers and adapted to pass around the support for the mirror on the side remote from the upper edge of the mirror to secure the first element to the mirror.

4. An antiglare device for attachment to the rearview mirror of an automobile comprising means for detachably mounting the device on a mirror including a narrow elongated sheet metal element terminating at each end in an apertured ear extending laterally of the plane of said element, a pair of strips rigid with said element bent to extend first laterally of the plane of said element in a direction opposite to said ears and thence to have depending portions extending generally parallel to the plane of said element to form with said element clip-like means receivable over the edge of a mirror with the element opposite the front face of the mirror and the depending portions of the strips opposite the rear face of the mirror and a tension spring attached at its ends to the free ends of said strips with at least one end detachable to facilitate attachment of the device to the mirror, and a shield of light-transfusing material pivotally supported on the ears of said element to be swingable from an out-of-the-way position to a position overlying the front face of the mirror.

HENRY CLAY ARMSTRONG.

REFERENCES CITED

The following references are of record in the file of this patent:

UNITED STATES PATENTS

| Number | Name | Date |
| --- | --- | --- |
| 1,058,882 | McCauley | Apr. 15, 1913 |
| 1,319,334 | Hartung | Oct. 21, 1919 |
| 1,470,553 | Church | Oct. 9, 1923 |
| 1,498,524 | Gage | June 17, 1924 |
| 1,717,072 | Stadt et al. | June 11, 1929 |
| 1,885,594 | Drury | Nov. 1, 1932 |
| 1,971,333 | Allam | Aug. 28, 1934 |
| 1,994,648 | Hoile | Mar. 19, 1935 |
| 2,070,434 | Kangas | Feb. 9, 1937 |
| 2,118,962 | Barron | May 31, 1938 |

FOREIGN PATENTS

| Number | Country | Date |
| --- | --- | --- |
| 447,605 | Great Britain | May 21, 1936 |
| 459,154 | Great Britain | Jan. 4, 1937 |